United States Patent
Chen

(10) Patent No.: US 8,095,246 B2
(45) Date of Patent: Jan. 10, 2012

(54) SYSTEM AND METHOD FOR AUTOMATICALLY DETERMINING TEMPERATURE TOLERANCE RANGE

(75) Inventor: Cheng-Chi Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 317 days.

(21) Appl. No.: 12/558,592

(22) Filed: Sep. 14, 2009

(65) Prior Publication Data

US 2011/0040423 A1    Feb. 17, 2011

(30) Foreign Application Priority Data

Aug. 13, 2009   (CN) .......................... 2009 1 0305573

(51) Int. Cl.
*G06F 19/00*   (2006.01)
(52) U.S. Cl. ........................................ 700/299; 700/300
(58) Field of Classification Search .................. 700/299, 700/300; 438/478; 713/300; 219/201
See application file for complete search history.

(56) References Cited

U.S. PATENT DOCUMENTS

| | | | |
|---|---|---|---|
| 6,015,465 A * | 1/2000 | Kholodenko et al. | 118/719 |
| 2005/0178219 A1* | 8/2005 | Grossman et al. | 73/865.6 |
| 2007/0116614 A1* | 5/2007 | Onoue | 422/109 |
| 2008/0128588 A1* | 6/2008 | Okamoto | 250/206 |

* cited by examiner

*Primary Examiner* — Kidest Bahta
(74) *Attorney, Agent, or Firm* — Altis Law Group, Inc.

(57) ABSTRACT

A system for automatically determining a temperature tolerance range of an electronic device directs a temperature regulator to regulate a temperature equaling a previous regulated temperature plus or less a temperature difference. When a determination module determines the electronic device has failed to power on or a test of the electronic device for testing hardware of the electronic device has failed after the electronic device is powered on at a regulated temperature, a limit value of a temperature tolerance range for the electronic device is ascertained. The limit value is equal to the regulated temperature, under which the electronic device has failed to power on or test has failed, less or plus the temperature difference.

8 Claims, 5 Drawing Sheets

SYSTEM AND METHOD FOR AUTOMATICALLY DETERMINING TEMPERATURE TOLERANCE RANGE

BACKGROUND

1. Technical Field

The present disclosure relates to systems and methods, and particularly to a system and a method for automatically determining a temperature tolerance range of an electronic device.

2. Description of Related Art

When a temperature tolerance range of a computer is being determined, the computer is often received in a chamber. The temperature tolerance range of the computer is ascertained by changing the temperature of the chamber. However, it is inconvenient and time consuming to regulate temperature of the chamber manually.

DETAILED DESCRIPTION

Figure 1:
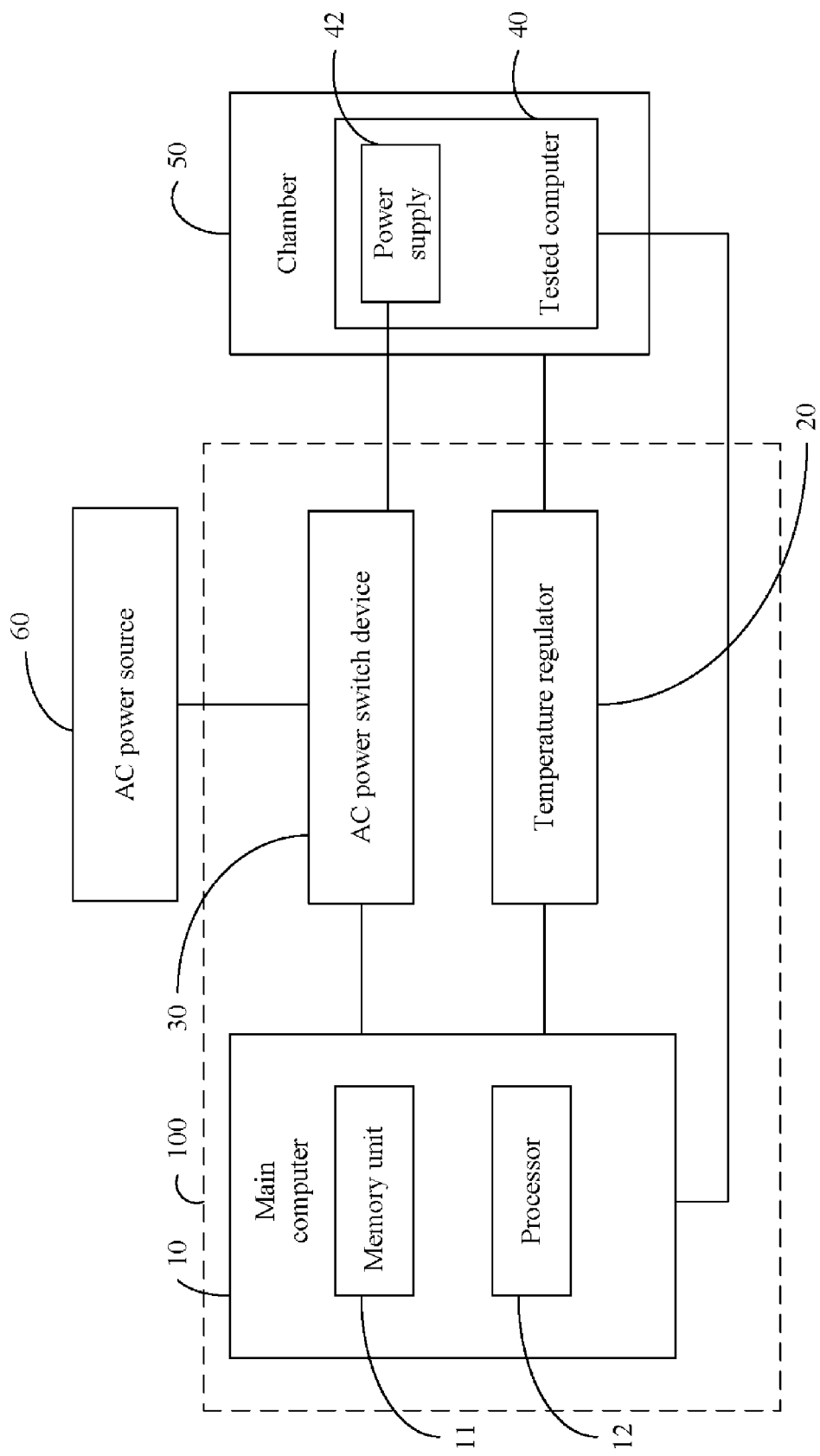
FIG. 1 is a block diagram of one embodiment of a system for automatically determining a temperature tolerance range, the system including a memory unit.

Referring to FIG. 1, an exemplary embodiment of a system 100 for automatic determining a temperature tolerance range of an electronic device, such as a tested computer 40 having a power supply 42, is illustrated. The system 100 includes a main computer 10 connected to the tested computer 40, a temperature regulator 20 connected to the main computer 10, and an alternating current (AC) power switch device 30 connected between the main computer 10 and the power supply 42 of the tested computer 40. The AC power switch device 30 is also connected to an AC power source 60. The main computer 10 includes a memory unit 11 and a processor 12 connected to the memory unit 50. The tested computer 40 is received in a chamber 50 when the temperature tolerance range of the tested computer 40 is determined. The temperature regulator 20 is also connected to the chamber 50 to regulate a temperature of the chamber 50.

The memory unit 11 may include a random access memory (RAM) for temporary storage of information and/or a read only memory (ROM) for permanent storage of information.

Figure 2:
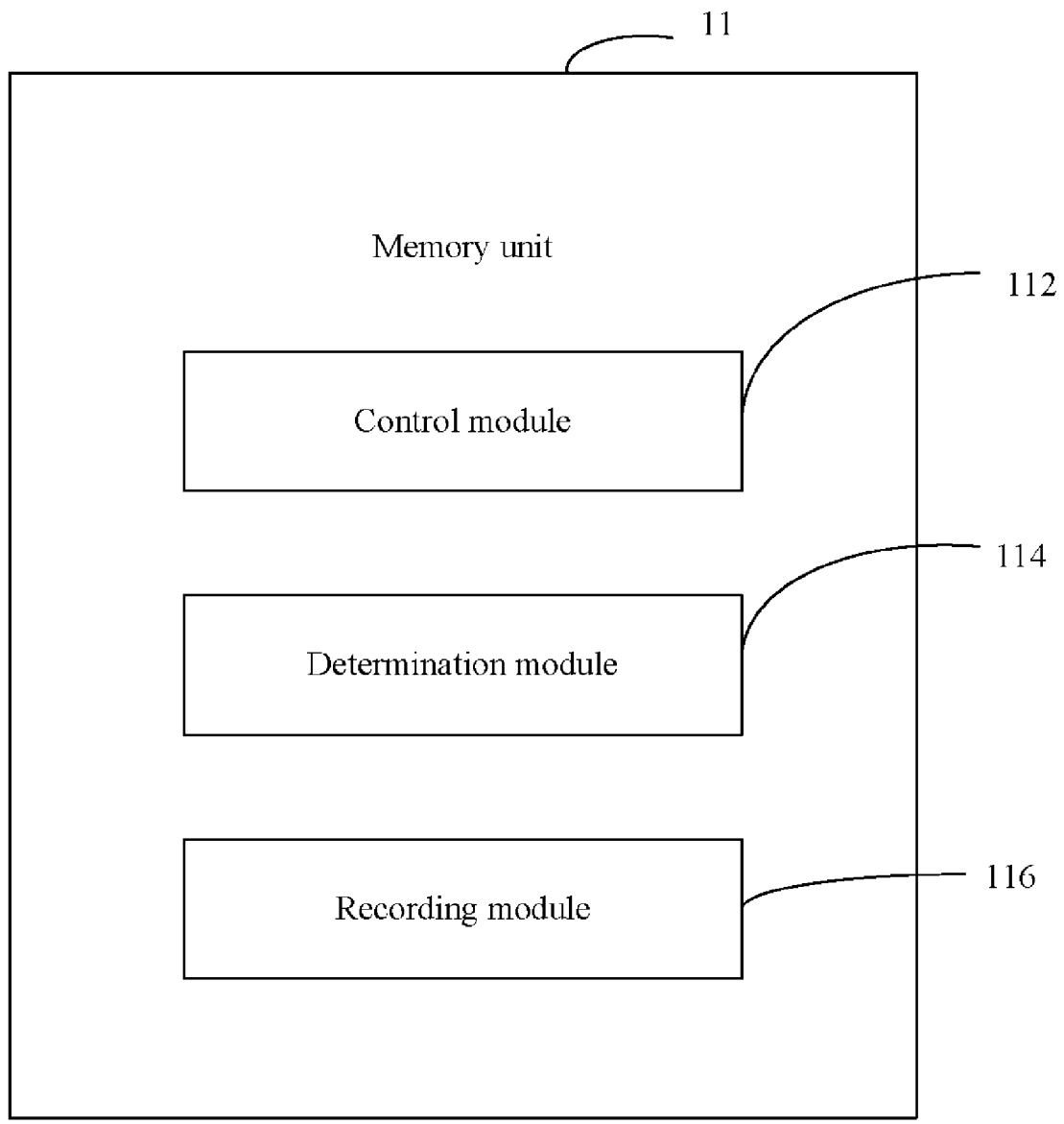
FIG. 2 is a block diagram of the memory unit of FIG. 1.

Referring to FIG. 2, the memory unit 11 includes a control module 112, a determination module 114, and a recording module 116. The control module 112, the determination module 114, and the recording module 116 may include one or more computerized instructions executable by the processor 12.

The control module 112 is operable to direct the temperature regulator 20 to regulate the temperature of the chamber 50, and turn on the AC power switch device 30 to output an AC voltage from the AC power source 60 to the power supply 42 of the tested computer 40 after regulating the temperature of the chamber 50.

The power supply 42 is operable to convert the received AC voltage to a direct current (DC) voltage to power the tested computer 40.

The determination module 114 is operable to determine whether the tested computer 40 can power on at the regulated temperature, and output a determination that the tested computer 40 can power on or has failed to power on to the control module 112. If the tested computer 40 can power on, the tested computer 40 implements an application to test hardware of the tested computer 40, such as the central processing unit, the memory, the compact disc read-only memory, and others.

The determination module 114 is also operable to determine whether the test is successful after the tested computer 40 implements the testing application, and output a determination that the test is successful or has failed, to the control module 112. If the test is successful, the control module 12 directs the temperature regulator 20 to continue to regulate the temperature of the chamber 50 to a temperature equaling that at the previous determination, and plus or less the reference temperature.

The control module 112 is also operable to turn off the tested computer and the AC power switch device 30 after receiving the result denoting that the test has failed, and output a control signal to the recording module 116. The control module 112 is also operable to turn off the AC power switch device 30 to stop supplying power to the tested computer 40 after receiving the determination that the tested computer 40 has failed to power on, and output a control signal to the recording module 116.

When an upper limit value of the temperature tolerance range is to be determined, the control module 112 directs the temperature regulator 20 to regulate the temperature of the chamber 50 to equal the reference temperature plus a temperature difference for the first time. The control module 12 directs the temperature regulator 20 to regulate the temperature of the chamber 50 to equal the previous regulated temperature plus the temperature difference every time after the first time. If the control module 112 receives the determination that the tested computer 40 has failed to power on or the determination that the test has failed, the system 100 stops determining the upper limit value of the temperature tolerance range of the tested computer 40. The upper limit value of the temperature tolerance range is equal to the regulated temperature under which the tested computer 40 has failed to power on or the test has failed this time less the temperature difference. The reference temperature is the temperature at which the tested computer 40 can power on under normal conditions. In the embodiment, the reference temperature is 24° C.

When a lower limit value of the temperature tolerance range is to be determined, the control module 112 directs the temperature regulator 20 to regulate the temperature of the chamber 50 to a temperature equaling the reference temperature less the temperature difference for the first time. The control module 12 directs the temperature regulator 20 to regulate the temperature of the chamber 50 to a temperature equaling the previous regulated temperature less the temperature difference for every time after the first time. If the control module 112 receives determination that the tested computer 40 has failed to power on or the determination that the test has failed, the system 100 stops determination of the lower limit value of the temperature tolerance range of the tested computer 40. The lower limit value of the temperature tolerance range is equal to the regulated temperature under which the tested computer 40 has failed to power on or the test has failed the last time the temperature difference was subtracted.

The recording module 16 is operable to record the determined upper limit value and the determined lower limit value after receiving the control signal.

In the embodiment, the temperature difference is 5° C. In other embodiments, the temperature difference can be set as another value or a negative value. If the temperature difference is negative, the determined upper limit value is a lower limit value. The determined lower limit value is an upper limit value.

Figure 3A:
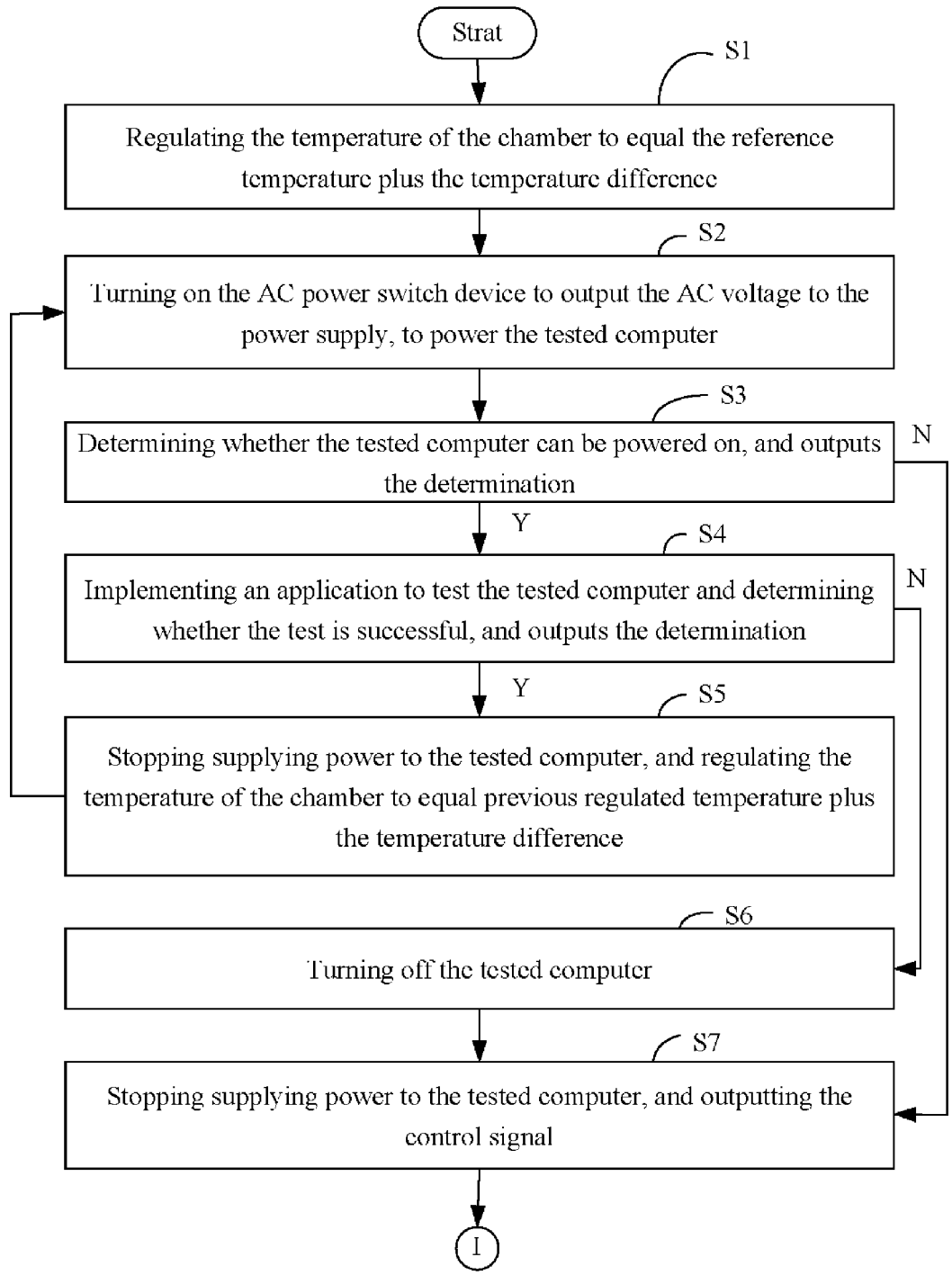
FIGS. 3A-3C is a flowchart illustrating one embodiment of a method for automatically determining a temperature tolerance range.
Figure 3B:
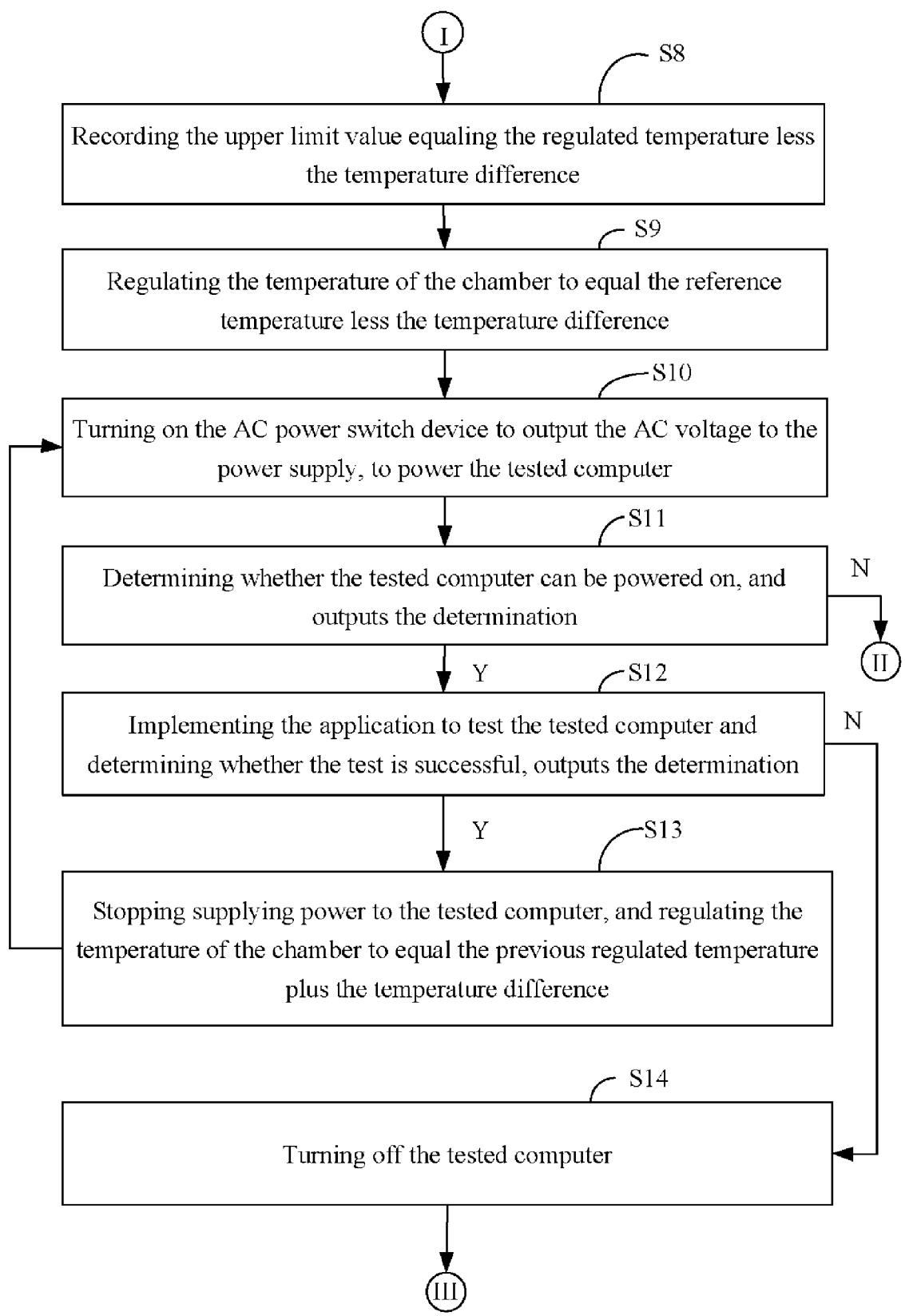
Figure 3C:
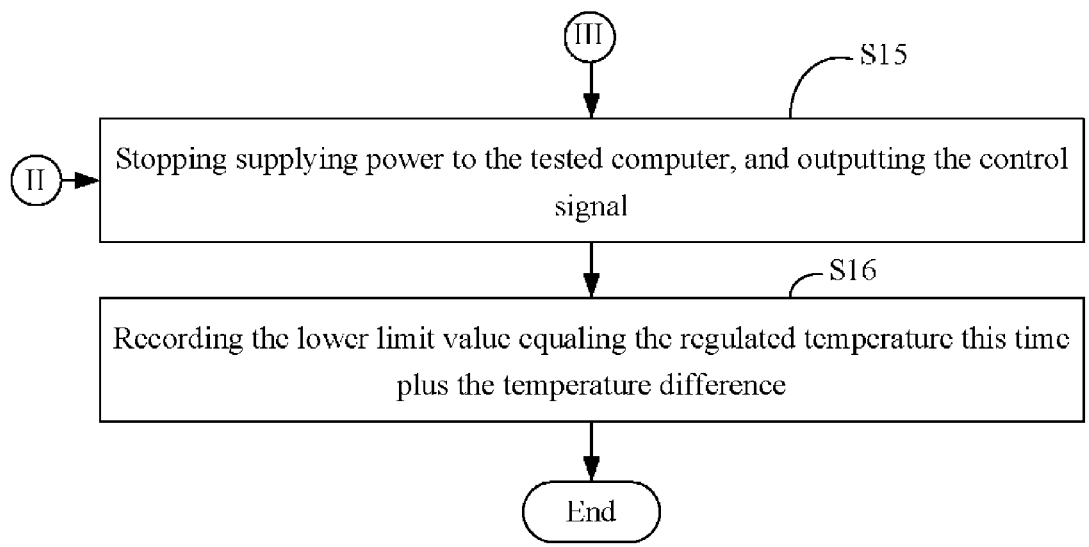

Referring to FIG. 3, an exemplary embodiment of a method for automatically determining the temperature tolerance range of the tested computer 40 includes the following steps.

In step S1, the control module 112 directs the temperature regulator 20 to regulate the temperature of the chamber 50 to equal the reference temperature plus the temperature difference.

In step S2, the control module 112 turns on the AC power switch device 30 to output the AC voltage from the AC power source 60 to the power supply 42, to convert the AC voltage to the DC voltage to power the tested computer 40.

In step S3, the determination module 114 determines whether the tested computer 40 can power on, and outputs the determination to the control module 112. If the control module 112 receives the determination that the tested computer 40 is powered on, step S4 is implemented. If the control module 12 receives the determination that the tested computer 40 has failed to power on, step S7 is implemented.

In step S4, the tested computer 40 implements a testing application to test the hardware of the tested computer 40, such as the CPU, the memory, and so on. The determination module 114 determines whether the test is successful, and outputs the determination to the control module 112. If the control module 112 receives determination that the test is successful, step S5 is implemented. If the control module 112 receives determination that the test has failed, step S6 is implemented.

In step S5, the control module 112 turns off the tested computer 40 and the AC power switch device 30 to stop supplying power to the power supply 42 of the tested computer 40, and directs the temperature regulator 20 to regulate the temperature of the chamber 50 to equal the previous regulated temperature plus the temperature difference, step S2 is repeated.

In step S6, the control module 112 turns off the tested computer 40.

In step S7, the control module 112 turns off the AC power switch device 30 to stop supplying power to the tested computer 40, and outputs the control signal to the recording module 16.

In step S8, the recording module 16 records the upper limit value equaling the regulated temperature less the temperature difference. The system 100 stops determining the upper limit value of the temperature tolerance range of the tested computer 40.

In step S9, the control module 112 directs the temperature regulator 20 to regulate the temperature of the chamber 50 to equal the reference temperature less the temperature difference.

In step S10, the control module 112 turns on the AC power switch device 30 to output the AC voltage from the AC power source 60 to the power supply 42, to convert the AC voltage to the DC voltage to power the tested computer 40.

In step S11, the determination module 114 determines whether the tested computer 40 is powered on, and outputs the determination to the control module 112. If the control module 112 receives the determination that the tested computer 40 is powered on, step S12 is implemented. If the control module 12 receives the determination that the tested computer 40 has failed to power on, step S15 is implemented.

In step S12, the tested computer 40 implements a testing application to test the hardware of the tested computer 40, such as the CPU, the memory, and so on. The determination module 114 determines whether the test is successful, and outputs the determination to the control module 112. If the control module 112 receives the determination that the test is successful, step S13 is implemented. If the control module 112 receives the determination that the test has failed, step S14 is implemented.

In step S13, the control module 112 turns off the tested computer 40 and the AC power switch device 30 to stop supplying power to the power supply 42 of the tested computer 40, and directs the temperature regulator 20 to regulate the temperature of the chamber 50 to equal the previous regulated temperature plus the temperature difference, step S10 is repeated.

In step S14, the control module 112 turns off the tested computer 40.

In step S15, the control module 112 turns off the AC power switch device 30 to stop supplying power to the tested computer 40, and outputs the control signal to the recording module 116.

In step S16, the recording module 16 records the lower limit value equaling the regulated temperature this time plus the temperature difference. The system 100 stops determination of the lower limit value of the temperature tolerance range of the tested computer 40. The system 100 stops determining the temperature tolerance range of the tested computer 40.

In other embodiments, the system 100 can measure the upper limit value or the lower limit value of the temperature tolerance range of the tested computer 40 according to need. If the system 100 only measures the upper limit value of the temperature tolerance range, steps S9-S16 can be omitted. If the system 100 only measures the lower limit value of the temperature tolerance range, steps S1-S8 can be omitted.

For example, if the reference temperature is 24° C., when the upper limit value of the temperature tolerance range of the tested computer 40 is determined, the control module 112 directs the temperature regulator 20 to regulate the temperature of the chamber 50 to 29° C. The control module 112 turns on the AC power switch device 30 to power the tested computer 40. The determination module 114 determines that the tested computer 40 is powered on. The tested computer 40 implements the testing application. The determination module 114 determines that the test is successful. The control module 112 turns off the tested computer 40 and the AC power switch device 30 to stop supplying power to the tested computer 40. The control module 12 directs the temperature regulator 20 to regulate the temperature of the chamber to 34° C. again. The following steps are the same as those previously described. The system 100 stops determining the upper limit value of the temperature tolerance range of the tested computer 40 until the tested computer 40 has failed to power on or the test has failed at a temperature. The recording module 16 records the upper limit value equaling the temperature under which the tested computer 40 has failed to power on or the test has failed less the temperature difference. The system 100 starts to measure the lower limit value of the temperature tolerance range of the tested computer 40. A process of determination of the lower limit value of the temperature tolerance range of the tested computer 40 is the same as the process of determining the upper limit value.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A system for automatically determining a temperature tolerance range of an electronic device, the system comprising:
a temperature regulator to regulate a temperature surrounding the electrical device;
a main computer connected to the temperature regulator and the electronic device, the main computer comprising:
a processor; and
a memory unit connected to the processor, and storing plurality of modules each of which contains one or more computerized instructions being executed by the processor, wherein the plurality of modules comprises:
a control module directing the temperature regulator to regulate the temperature surrounding the electronic device to equal to a reference temperature plus a temperature difference for the first time, regulate the temperature surrounding the electronic device to equal the previous regulated temperature plus the temperature difference for every time after the first time when a limit value of the temperature tolerance range is being determined, and supply a voltage to the electronic device after regulating the temperature surrounding the electronic device; wherein the reference temperature is the temperature at which the electronic device can power on under normal conditions;
a determination module to determine whether the electronic device is powered on at the regulated temperature, and output a determination that the electronic device is powered on or has failed to power on, wherein if the electronic device is powered on, the electronic device implements an application to test hardware of the electronic device, the determination module also determines whether the test is successful after performing the test software, and outputs a determination that the test is successful or has failed, wherein if the test is successful, the control module directs the temperature regulator to continue to regulate the temperature surrounding the electronic device to equal the previous regulated temperature plus the reference temperature; if the determination denotes that the electronic device has failed to power on or determination denotes that the test has failed is received, the control module stops supplying the voltage to the electronic device and outputs a control signal; and
a recording module to record a temperature equaling the temperature under which the electronic device has failed to power on or the test has failed less the temperature difference as the limit value of the temperature tolerance range after receiving the control signal.

2. The system of claim 1, further comprising: an alternating current (AC) power switch device, wherein the control module is further used to turn on the AC power switch device to output an AC voltage to a power supply of the electronic device, to convert a direct current (DC) voltage to the electronic device, and to turn off the AC power switch device to stop supplying the DC voltage to the electronic device after receiving determination that the electronic device has failed to power on.

3. The system of claim 1, wherein the temperature difference is 5° C., and the limit value is an upper limit value of the temperature tolerance range of the electronic device.

4. The system of claim 3, wherein the temperature difference is −5° C., and the limit value is a lower limit value of the temperature tolerance range of the electronic device.

5. A method for automatically determining a temperature tolerance range of an electronic device, the method comprising:
a: directing a temperature regulator to regulate a temperature surrounding the electronic device to equal a reference temperature plus a temperature difference, wherein the reference temperature is the temperature at which the electronic device can power on under normal conditions;
b: supplying a direct current (DC) voltage to the electronic device;
c: determining whether the electronic device is powered on, and outputting a determination; if the determination denotes that the tested computer is power on, step d is implemented, and, if not, step g is implemented;
d: implementing a testing application, determining whether the test is successful, and outputting the determination; if the determination denotes that the test is successful, step e is implemented; if not, step f is implemented;
e: turning off the electronic device and directing the temperature regulator to regulate the temperature surrounding the electronic device to equal the previous regulated temperature plus the temperature difference, and step b is repeated;
f: turning off the electronic device;
g: stopping the DC voltage to the electronic device, and outputting a control signal; and
h: recording a limit value equaling the regulated temperature less the temperature difference when receiving the control signal, and stopping determining the limit value of the temperature tolerance range of the electronic device.

6. The method of claim 5, wherein the temperature difference is 5° C., and the limit value is an upper limit value of the temperature tolerance range of the electronic device.

7. The method of claim 6, wherein when a lower limit value of the temperature tolerance range is to be determined, the method further comprises:
i: directing the temperature regulator to regulate a temperature surrounding the electronic device to equal a reference temperature less the temperature difference;
j: supplying a direct current (DC) voltage to the electronic device;
k: determining whether the electronic device is powered on, and outputting the determination; if the determination denotes that the tested computer is powered on, step l is implemented, and; if the determination denotes that the tested power has failed to power on, step o is implemented;
l: implementing a testing application, determining whether the test is successful, and outputting a determination; and, if the determination denotes that the test is successful, step m is implemented; and if the determination denotes that the test has failed, step n is implemented;
m: turning off the electronic device and directing the temperature regulator to regulate the temperature surrounding the electronic device to equal the previous regulated temperature less the temperature difference, and step j is repeated;
n: turning off the electronic device;

o: stopping the DC voltage to the electronic device, and outputting a control signal; and
p: recording the lower limit value equaling the current regulated temperature plus the temperature difference, and stopping determination of the lower limit value of the temperature tolerance range of the electronic device.

8. The method of claim 5, wherein the temperature difference is −5° C., and the limit value is a lower limit value of the temperature tolerance range of the electronic device.

* * * * *